July 8, 1941.　　　W. J. HOOPER　　　2,248,238
CONNECTOR
Filed Oct. 7, 1939　　　3 Sheets-Sheet 3
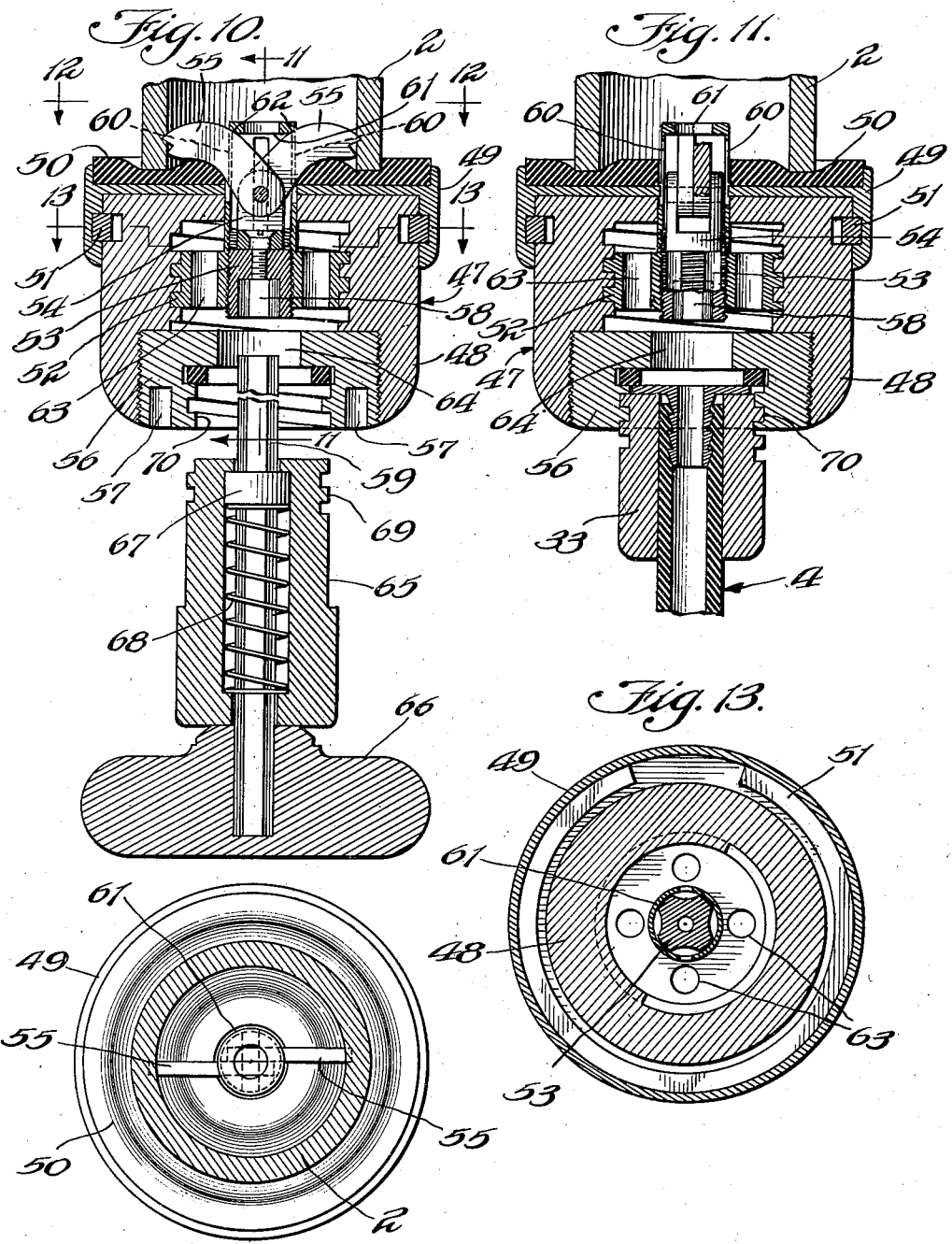
INVENTOR.
William J. Hooper
BY Parkinson Lane
ATTORNEY.

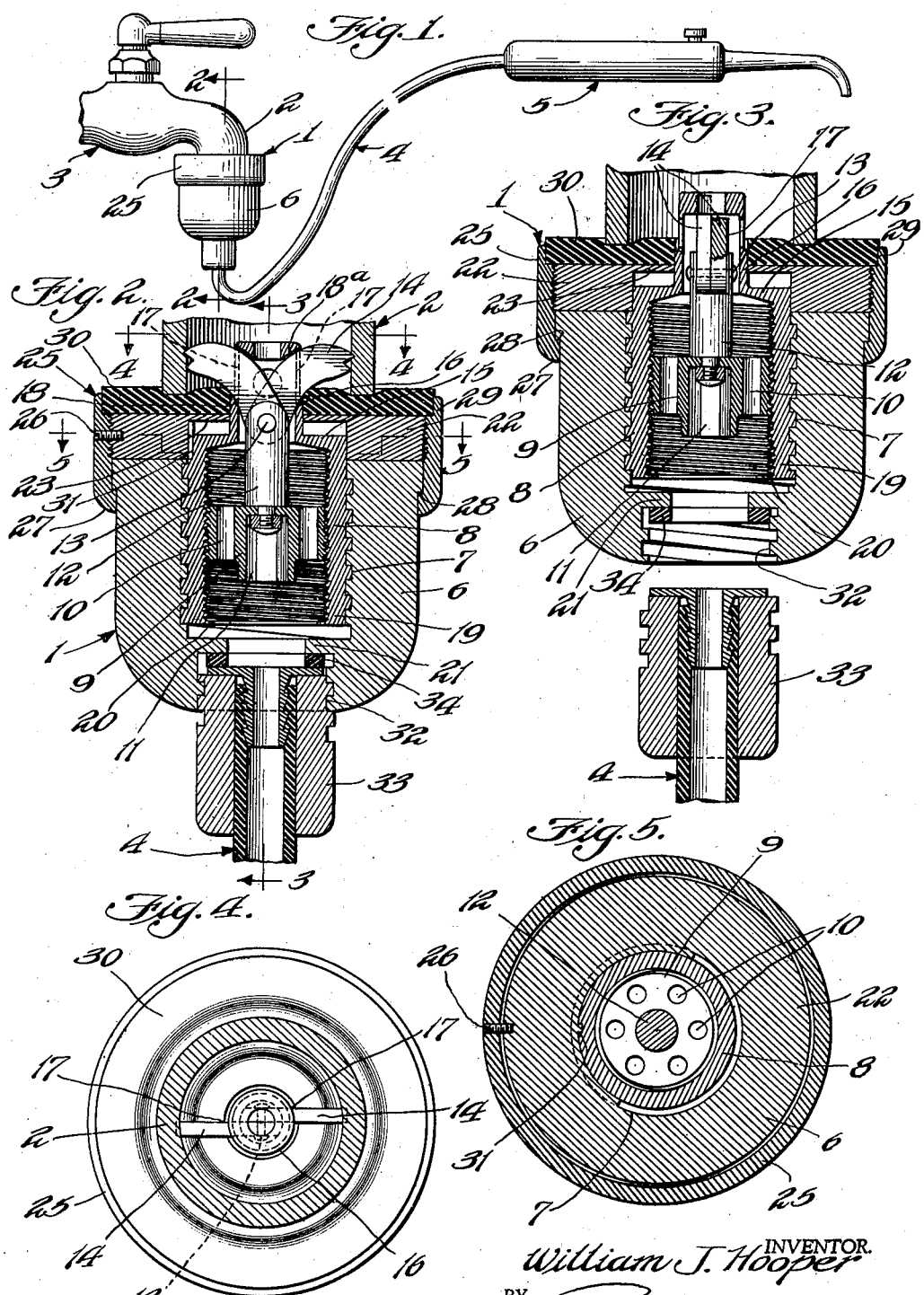

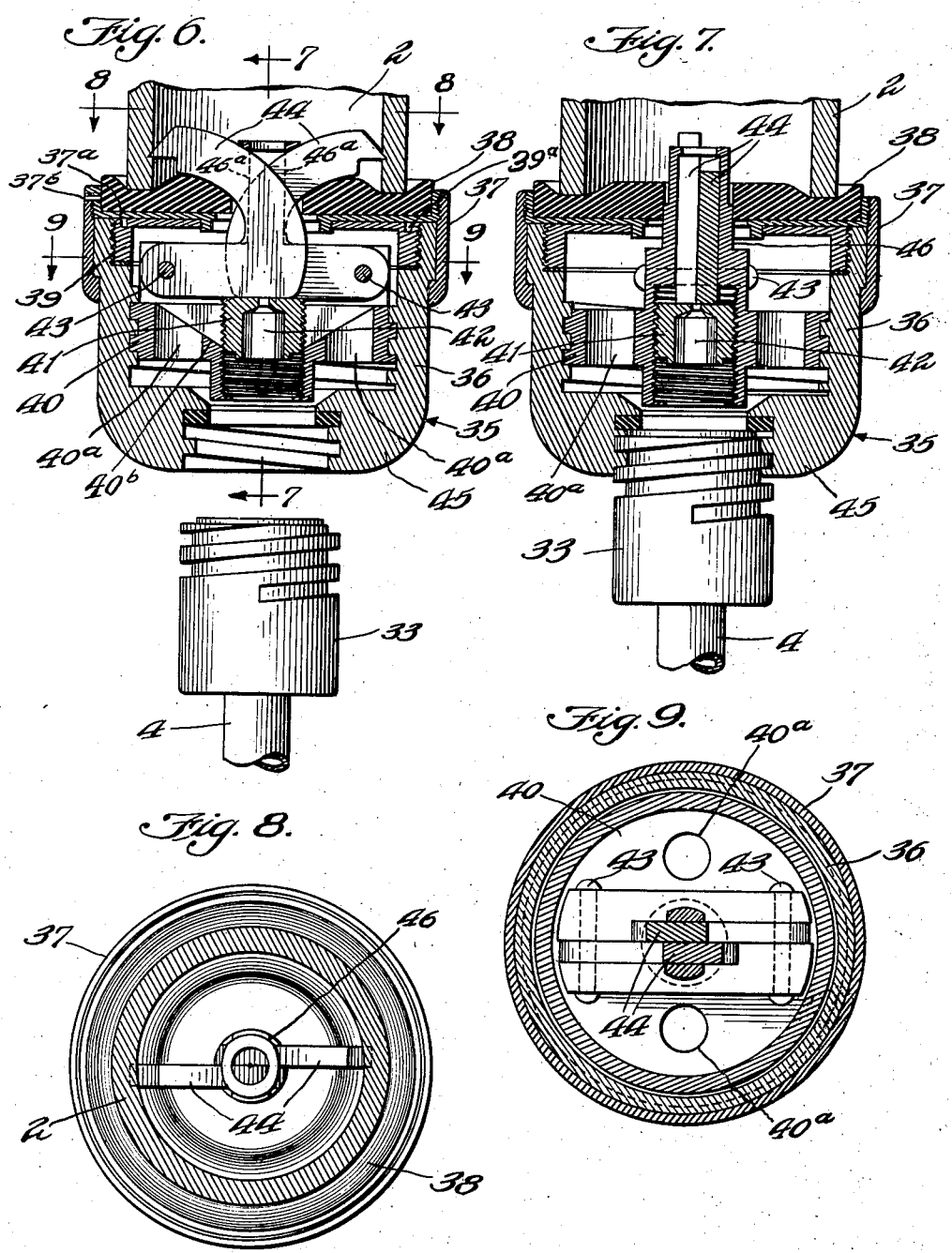

Patented July 8, 1941

2,248,238

UNITED STATES PATENT OFFICE 2,248,238

CONNECTOR

William J. Hooper, Elsah, Ill., assignor of one-half to Harold A. Hooper, Chicago, Ill.

Application October 7, 1939, Serial No. 298,483

5 Claims. (Cl. 285—90)

The present invention relates to a connector and more particularly to a device adapted to be quickly and securely attached to a faucet for supplying water or other fluid to a dental syringe, douche or other spray, as desired.

In the prior types of connectors now on the market, difficulty is had in applying and retaining the connector on the faucet, particularly when the fluid stream is under any appreciable pressure. Considerable inconvenience naturally follows should the connector become disengaged or loose upon the nozzle of the faucet. In the present device, the connector is securely anchored upon the discharge end or nozzle of the faucet in such manner as to eliminate all danger of leakage and accidental disengagement.

Another novel feature of the present invention is the provision of adjustable means so constructed and arranged that the connector may be applied and locked in position on nozzles of varying internal and external diameters and contours. The present novel invention is adapted for home as well as office and laboratory use since it will accommodate and may be secured to a large range of faucets having different size nozzles.

Another object is the provision of a compact self-contained unit including the faucet connector and a key for quickly applying and securely locking the connector upon a faucet, and for ready removal and replacement. It may be applied by one without experience and without danger of accidental removal, regardless of the volume and pressure of the discharge fluid.

The invention further comprehends a novel assembly in which the parts are so related and combined as to provide a simplified and highly efficient attachment insuring against leakage under all conditions of operation.

Further objects are to provide a construction of maximum simplicity, efficiency, economy and ease of assembly, removal and/or replacement, and such further objects, advantages and capabilities as will later more fully appear and as are inherently possessed thereby.

The invention further resides in the combination, construction and arrangement of parts illustrated in the accompanying drawings, although it is to be understood that the embodiment selected to illustrate the invention is susceptible of modification and change, and comprehends other details, arrangements of parts, features and constructions without departing from the spirit of the invention.

In the drawings:

Fig. 1 is a view in side elevation of the novel connector assembled on a faucet and attached to a hose leading to a dental syringe or spray.

Fig. 2 is an enlarged view in vertical cross section through the connector and taken on the line 2—2 of Fig. 1.

Fig. 3 is a view in vertical cross section taken in a plane represented by the line 3—3 of Fig. 2.

Fig. 4 is a view in horizontal cross section taken on the line 4—4 of Fig. 2.

Fig. 5 is a view in horizontal cross section taken on the irregular line 5—5 of Fig. 2.

Fig. 6 is a view in vertical cross section of an alternate but highly important form of the invention.

Fig. 7 is a view in vertical cross section taken in a plane represented by the line 7—7 of Fig. 6.

Fig. 8 and Fig. 9 are views in horizontal cross section taken on lines 8—8 and 9—9, respectively, of Fig. 6.

Fig. 10 is a view in vertical cross section of a further alternate form of the invention including a novel key arrangement for locking the connector in position.

Fig. 11 is a view in vertical cross section taken on the line 11—11 of Fig. 10 but with the key removed and a hose connected to the attachment.

Figs. 12 and 13 are views in horizontal cross section taken on lines 12—12 and 13—13, respectively, of Fig. 10.

Referring more particularly to the disclosure in Figures 1 to 5, inclusive, the embodiment therein selected to illustrate the invention comprises a connector or attachment 1 adapted to be securely mounted on the discharge nozzle 2 of a faucet 3. Attached to this connector is a hose 4 leading to a dental spray or syringe, douche or the like 5.

The novel connector 1 comprises a cup-shaped body member or holder 6 internally threaded at 7 to receive an externally threaded barrel 8. This barrel is also internally threaded to receive a collar 9 threaded for longitudinal movement within the barrel. This collar is provided with a plurality of spaced openings 10 for the passage of the discharge fluid, and a socket 11 for receiving a key having an external configuration complementary to that of the socket. Centrally secured to the upper face of the socket is a shank or stem 12, to the outer end of which is pivotally mounted at 13 a pair of locking claws or anchoring jaws 14 adapted to engage the inner surface of the faucet nozzle 2 and anchor the connector in position.

The barrel 8 is hollowed out for the greater portion of its length but at its upper end is formed with an inwardly projecting shoulder 15 merging into an upwardly projecting sleeve 16 having oppositely disposed slots 17 and lower and upper shoulders 18 and 18ª adapted to guide the cam or curved surfaces of the claws 14 during their extension and recession whenever the collar 9 is screwed or unscrewed in the barrel 8. To prevent accidental removal or complete unscrewing of the collar 9 and its claws 14 from the barrel 8, the invention comprehends provision of a limiting means formed by spinning the lower end 19 of the barrel inwardly to provide an inturned flange 20 of less internal diameter than the external diameter of the collar 9, and against which the collar abuts whenever it is unscrewed to the limit of its movement.

Means are also provided for limiting the longitudinal movement of the barrel 8 in the holder 6. At the lower end this is accomplished by means of an internal shoulder or flange 21 and at the upper end the abutment comprises an annular plate 22 having a reduced inwardly projecting flange or shoulder 23. This plate 22 is associated with the holder by means of an encompassing ring 25 preferably of metal and threaded onto the plate 22 and locked thereon by a set screw 26. This ring is formed at its lower end with a shoulder 27 engaging an abutment 28 on the holder 6, and at its upper end with a reduced flange 29 adapted to retain a resilient sealing washer 30 of rubber or the like. The barrel is movable longitudinally in the holder but prevented from rotating with respect to the plate 22 and ring 25 by means of a key 31 seating in a slot or keyway in the plate 22. By means of this construction, the holder rotates relative to the ring and plate whereby to tend to raise and lower the barrel 8 and its sleeve 16, as well as the enclosed collar 9 and clamping claws 14, or to raise and lower the holder relative to these members, so as to tightly seat the washer 30 against the lower edge of the nozzle 2. This provides a most effective clamping device for securely mounting the connector onto the faucet.

In the assembly of the device upon the faucet, the ring 25 is grasped by the operator between the thumb and forefinger of one hand and the holder 6 is grasped in the other hand after the claws 14 have been retracted and the holder has been unscrewed to lower the barrel 8. The connector is then applied to the lower end of the faucet with the ends of the claws disposed within the nozzle, and by means of a key or other tool such as an ordinarly L-shaped hexagon wrench, the claws are expanded to the position shown in Fig. 2 of the drawings, wherein they tightly grip the interior of the nozzle. After the claws have so gripped the inner surface of the nozzle, the holder 6 is pushed upwardly and rotated in a right hand direction whereby to cause relative longitudinal movement of the holder relative to the barrel 8 and its enclosed collar and claws until the washer 30 and end of the nozzle engage in a tight sealing contact as will be apparent from Fig. 2 of the drawings. The lower end of the holder is shown as threaded at 32 to receive a threaded coupling 33 carrying the hose connection 4. A washer 34 is also provided for forming a fluid tight seal between the holder and coupling.

Figs. 6 to 9, inclusive, disclose an alternate and simplified form of the device in which the connector 35 comprises a cup-shaped holder 36 upon which is rotatably mounted a ring 37 and plate 37ª carrying a resilient washer 38 of rubber or the like. This plate and ring are shown as pinned together at 37ᵇ, with the plate 37ª seated upon an annular collar 39 threaded into the holder. This arrangement permits rotation of the holder with respect to the ring 37 and plate 37ª. Threadedly mounted in the holder is a barrel 40 carrying a centrally disposed threaded collar 41 having a socket 42. Freely pivoted at 43 is a pair of clamping claws 44 which are manually raised by the insertion of a key within the socket 42, whereby rotation of the collar 41 in a manner to cause its elevation causes the collar to abut the claws and raise them into clamping or anchoring position within the nozzle 2. The barrel is provided with discharge openings 40ª and with tapered slots 40ᵇ for retraction of the jaws when the collar 41 abutting these jaws is lowered. The lower end of the holders is reduced at 45 and internally threaded for connection with the coupling 33 of the hose connection 4.

The clamping jaws or claws 44 which anchor the connector upon the faucet nozzle 2 extend upwardly within the projecting arms 46 and through the opposed slots 46ª. Keyholes 39ª are provided in the lower plate or collar 39 for unscrewing this member and securing access to the interior of the connector.

Figs. 10 to 13, inclusive, disclose a further alternate form of the invention in which the connector 47 comprises a holder 48 to which a metal ring 49, carrying a washer 50 of rubber or the like, is keyed against longitudinal movement but permitting relative rotation. This is accomplished by means of a split ring 51 adapted to move in opposed annular slots or grooves in the ring and holder. In the holder is threaded a barrel 52 in which is centrally disposed a threaded collar 53 having a shank or stem 54 upon which is freely pivoted a pair of clamping jaws or claws 55. In the lower end of this holder is threadedly mounted a sleeve 56 having a pair of spaced keyways 57 for the insertion of a tool to secure access to the inner barrel 52 and collar 53. The collar 53 is provided with a socket 58 having a polygonal opening adapted to receive the complementary end of a key 59 for raising or lowering the collar and its claws 55. These claws extend through oppositely opening slots 60 in a cylindrical sleeve 61 forming a part of the collar 53 and the upper curved or cam surface of these claws engage guiding shoulders 62 formed at the upper end of this sleeve. Discharge openings 63 are provided in the barrel 52 for the fluid passing from the nozzle and hollow sleeve 61 to a discharge passage 64 in the sleeve 56. Fig. 10 shows the connector mounted in position and the key assembly in position to be attached or after it has been removed from the connector.

The novel key member comprises the key 59 passing through a hollow barrel 65 and a handle or knob 66. Upon the shank of the key is secured a collar 67 against which one end of a compression spring 68 seats, the other end of this spring seating against the lower shouldered portion of the barrel 65. Thus it will be seen that the barrel is slidable and rotatable upon the key so that its threaded end 69 may be readily screwed into the internal threads 70 in the collar or sleeve 56 and the barrel and key member quickly attached to or detached from the connector. In Fig. 11 the coupling 33 and hose 4 are shown attached when the connector is in use.

The embodiment disclosed in Figs. 6 to 9, inclusive, and 10 to 13, inclusive, although different somewhat in construction from that shown in Figs. 1 to 5, inclusive, operate in the same manner and are assembled in a like manner upon the nozzle. In each, means are provided for elevating and spreading the clamping jaws or claws and for retracting and disengaging these claws when the connector is to be removed. Furthermore, in each the barrel rotates relative to the holder so that rotation of the holder in a right hand direction tends to retract the barrel and collar which it carries in such manner as to cause longitudinal movement between these members. However, since in the assembly of the connector upon a faucet the clamping jaws or claws are first anchored in position and in that position can not move relative to the nozzle of the faucet, the holder is raised and lowered by rotation thereof and the washer is seated or unseated with respect to the lower end of the nozzle. It will be appreciated that this novel arrangement provides a most effective seal and in which the parts are readily adjustable and detachable. Furthermore, the connector may be readily applied to faucets of different sizes and contour.

The various parts may be formed of any materials suitable for the purpose, although I have secured excellent results by making or forming the holder of plastic materials.

Having thus disclosed the invention, I claim:

1. A connector adapted to be mounted upon the discharge nozzle of a faucet, comprising a cup-shaped member, a ring encompassing said member and in which said member is rotated, a barrel threaded in said member for longitudinal movement, a sleeve threaded in said barrel, a pair of clamping claws freely pivoted upon the upper end of the sleeve and adapted to anchor and retain the connector in the nozzle, means for adjusting the sleeve whereby to spread the claws into anchoring position or to retract them for detachment of the connector, and a washer carried in the ring and adapted to provide a fluid-tight seal with the end of the nozzle.

2. A connector adapted to be detachably mounted on the discharge nozzle of a faucet, comprising a hollow member, an encompassing ring in which said member is rotatably mounted, a sealing washer carried in the ring, adjustable claws in said member adapted to be projected into the nozzle and anchored therein, a key for adjusting said claws to accommodate nozzles of differing internal diameters or shapes, and means for engaging the washer with the end of the nozzle to form a fluid-tight seal.

3. A connector adapted to be secured upon the discharge end of a faucet and provide a fluid-tight seal therewith, comprising a hollow member carrying a sealing washer adapted to seat against the nozzle, a barrel threaded in said member for longitudinal movement, a sleeve threaded in said barrel for longitudinal movement, a pair of pivotally mounted clamping jaws in said member and adapted to be raised and lowered by longitudinal movement of the sleeve, and means for guiding the jaws into engagement with the interior of the nozzle when the jaws are raised, and retracted from such engagement when the jaws are lowered.

4. A connector adapted to be secured upon the discharge end of a faucet and provide a fluid-tight seal therewith, comprising a hollow member carrying a sealing washer adapted to seat against the nozzle, a barrel threaded in said member for longitudinal movement relative to said member, a sleeve rotatably mounted in the barrel so as to move vertically with respect to the barrel and member, a pair of freely pivoted clamping jaws at the upper end of the sleeve and adapted to be anchored in the faucet, means for rotating the sleeve to cause longitudinal movement of the sleeve and clamping jaws, and means for guiding the jaws into anchoring position when the sleeve is raised, and to retract the jaws from engagement with the nozzle when the sleeve is lowered.

5. A connector adapted to be detachably and adjustably mounted on the nozzle of a discharge faucet, comprising a hollw cup-shaped holder, a plate positioned at the upper end of the holder, and carrying a sealing washer, an encompassing member pinned to the plate and adapted to connect the holder and plate in a manner to prevent longitudinal movement therebetween, but permitting relative rotation between the holder and the plate and encompassing member, a barrel threaded in the holder for longitudinal movement, a sleeve rotatably mounted in the barrel so as to move vertically with respect to the barrel and holder, a pair of freely pivoted clamping jaws seating upon the upper end of the sleeve and adapted to be anchored in the nozzle of the faucet, means for rotating the sleeve and thereby cause longitudinal movement of the sleeve and a raising and lowering of the clamping jaws to engage and anchor the jaws in the nozzle, or to retract the jaws from such engagement, a rotation of the holder relative to the encompassing member, causing the holder to be raised or lowered with respect to the barrel and clamping jaws and the plate and washer moved into and out of sealing contact with the end of the nozzle.

WILLIAM J. HOOPER.